(12) United States Patent
Villarreal et al.

(10) Patent No.: US 9,142,908 B2
(45) Date of Patent: Sep. 22, 2015

(54) LOW PROFILE MALE CONNECTOR

(71) Applicant: Apple Inc., Cupertino, CA (US)

(72) Inventors: Cesar Lozano Villarreal, Sunnyvale, CA (US); Dominic E. Dolci, Oakland, CA (US); Victoria A. Spielmann, San Francisco, CA (US); Ricardo A. Mariano, Hayward, CA (US); Alexander M. Kwan, Los Altos Hills, CA (US); James G. Smeenge, Los Gatos, CA (US); Daniele De Iuliis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/281,064

(22) Filed: May 19, 2014

(65) Prior Publication Data

US 2014/0256186 A1    Sep. 11, 2014

Related U.S. Application Data

(63) Continuation of application No. 13/839,264, filed on Mar. 15, 2013, now Pat. No. 8,727,812, which is a continuation of application No. 13/112,995, filed on May 20, 2011, now Pat. No. 8,414,337.

(51) Int. Cl.
*H01R 24/00* (2011.01)
*H01R 13/516* (2006.01)
(Continued)

(52) U.S. Cl.
CPC ............ *H01R 13/516* (2013.01); *G06F 1/1632* (2013.01); *H01R 12/592* (2013.01); *H01R 12/65* (2013.01); *H01R 13/46* (2013.01); *H01R 31/06* (2013.01)

(58) Field of Classification Search
USPC .............................. 439/626, 660, 680, 607.05
See application file for complete search history.

(56) References Cited

U.S. PATENT DOCUMENTS 6,540,559 B1 *  4/2003  Kemmick et al. ......... 439/607.05
6,584,336 B1 *  6/2003  Ali et al. ..................... 600/323
(Continued)

FOREIGN PATENT DOCUMENTS

CN       201430312 Y    3/2010
CN       101740961 A    6/2010
(Continued)

OTHER PUBLICATIONS

Partial International Search Report for International Application No. PCT/US2012/038873, mailed on Aug. 1, 2012, 8 pages.
(Continued)

*Primary Examiner* — Jean F Duverne
(74) *Attorney, Agent, or Firm* — Kilpatrick Townsend & Stockton LLP

(57) ABSTRACT

Various embodiments of low profile male connectors are described. In one embodiment, a connector includes a plug housing having a depth and an interior cavity designed to accommodate pins that extend within the interior cavity in a direction of the depth. The plug housing may be designed to be fully insertable into a receptacle connector of an electronic device, and to have a rear surface that conforms with a shape of an exterior surface of the electronic device. The pins arranged in the plug housing may include various features, such as connecting portions protruding from the plug housing at an angle of approximately 90 degrees for coupling to a cable, bases including cutouts for extending a length of an elongated shaft of the pin, barbs for engaging the plug housing, and limit stops for distributing a force applied to the elongated shaft upon engagement with a receiving pin.

20 Claims, 13 Drawing Sheets

(51) Int. Cl.
  *H01R 12/59* (2011.01)
  *H01R 12/65* (2011.01)
  *H01R 31/06* (2006.01)
  *G06F 1/16* (2006.01)
  *H01R 13/46* (2006.01)

(56) References Cited

U.S. PATENT DOCUMENTS

| | | | |
|---|---|---|---|
| 7,125,287 | B1 | 10/2006 | Chou et al. |
| 7,293,122 | B1 | 11/2007 | Schubert et al. |
| 7,442,057 | B2 * | 10/2008 | Ko .................. 439/101 |
| 7,540,788 | B2 | 6/2009 | Murphy et al. |
| 7,544,066 | B1 | 6/2009 | Lynch et al. |
| 7,627,343 | B2 | 12/2009 | Fadell et al. |
| 7,684,186 | B2 * | 3/2010 | Chang ............. 361/679.43 |
| RE41,224 | E | 4/2010 | Kubota et al. |
| 7,709,946 | B2 | 5/2010 | Ryu et al. |
| 7,832,645 | B2 * | 11/2010 | Chen et al. ............ 235/492 |
| 7,909,652 | B2 | 3/2011 | Yang et al. |
| 7,918,689 | B2 | 4/2011 | Sloey et al. |
| 7,963,809 | B2 | 6/2011 | Hardell et al. |
| 7,988,496 | B2 | 8/2011 | Zhu |
| 8,096,815 | B2 | 1/2012 | Zhu |
| 8,102,657 | B2 | 1/2012 | Hiew et al. |
| 8,113,865 | B1 | 2/2012 | Yang et al. |
| 8,118,497 | B2 | 2/2012 | Yi |
| 8,342,890 | B2 | 1/2013 | Zhu |
| 8,414,337 | B2 | 4/2013 | Villareal et al. |
| 8,485,851 | B2 | 7/2013 | Kondo et al. |
| 8,532,727 | B2 * | 9/2013 | Ali et al. ................ 600/323 |
| 8,727,812 | B2 | 5/2014 | Villarreal et al. |
| 2002/0024794 | A1 * | 2/2002 | Lin et al. ................ 361/686 |
| 2007/0295982 | A1 | 12/2007 | Ryu et al. |
| 2008/0268711 | A1 * | 10/2008 | Miyazaki et al. ......... 439/626 |
| 2009/0061678 | A1 | 3/2009 | Minoo et al. |
| 2009/0093136 | A1 | 4/2009 | Hiew et al. |
| 2009/0179501 | A1 | 7/2009 | Randall |
| 2009/0236140 | A1 | 9/2009 | Randall |
| 2009/0247017 | A1 | 10/2009 | Wu |
| 2010/0081337 | A1 | 4/2010 | Dorogusker et al. |
| 2010/0255712 | A1 | 10/2010 | Huang et al. |
| 2011/0218414 | A1 | 9/2011 | Kamath et al. |
| 2012/0015544 | A1 | 1/2012 | Wu |

FOREIGN PATENT DOCUMENTS

| | | |
|---|---|---|
| JP | 63-56563 U | 4/1988 |
| JP | 3-95584 U | 9/1991 |
| JP | 2009048978 A | 3/2009 |
| WO | 2012/162255 A1 | 11/2012 |

OTHER PUBLICATIONS

International Search Report and Written Opinion for International Application No. PCT/US2012/038873, mailed on Oct. 1, 2012, 8 pages.

Examination Report under Section 18(3) for Great Britain Patent Application GB1208760.7, dated Sep. 19, 2012, 9 pages.

Non Final Office Action for U.S. Appl. No. 13/112,995, mailed on Feb. 7, 2012, 8 pages.

Final Office Action for U.S. Appl. No. 13/112,995, mailed on Jul. 23, 2012, 9 pages.

Notice of Allowance for U.S. Appl. No. 13/112,995, mailed on Dec. 7, 2012, 9 pages.

Examination Report for Australian Patent Application No. 2012202946, mailed on Jun. 24, 2013, 3 pages.

Office Action for Japanese Patent Application No. 2012-128374, mailed on Aug. 7, 2013, 5 pages.

Examination Report for Great Britain Patent Application No. GB1208760.7, mailed on Jul. 19, 2013, 2 pages.

International Preliminary Report on Patentability for International PCT Application No. PCT /US2012/038873, mailed Nov. 28, 2013, 13 pages.

Non-Final Office Action mailed on Aug. 19, 2013 for U.S. Appl. No. 13/839,264, 7 pages.

Notice of Allowance mailed on Jan. 7, 2014 for U.S. Appl. No. 13/839,264, 6 pages.

Chinese Office Action mailed on Jun. 19, 2014 for CN Patent Application No. 201210162344.3, with English translation, 16 pages.

Australian Office Action mailed on Jul. 16, 2014 for AU Patent Application No. 2012202946, 3 pages.

* cited by examiner

LOW PROFILE MALE CONNECTOR

CROSS-REFERENCES TO RELATED APPLICATION

The present application is a continuation of U.S. patent application Ser. No. 13/839,264, filed Mar. 15, 2013, which is a continuation of U.S. patent application Ser. No. 13/112,995, filed May 20, 2011, now U.S. Pat. No. 8,414,337, which are incorporated by reference.

BACKGROUND

1. Field of the Invention

The present invention relates to a connector. More particularly, the present invention relates to a low profile male connector adapted to be fully insertable into an electronic device and contoured to match an outer surface of the electronic device.

2. Description of the Related Art

Numerous types of electrical connectors for interconnecting electronic devices exist in the art. Such connectors typically include a receptacle (female) connector and a plug (male) connector. The plug connector may engage the receptacle connector for establishing an electrical connection between pin-shaped electrodes arranged in each connector.

With the diminishing size of electronic devices, there is a significant desire to similarly reduce the size of electrical connectors. However, as the size of electrical connectors is reduced, numerous problems arise. For example, reductions in a size of an electrical connector requires a corresponding reduction in size of pin-shaped electrodes arranged in the connector. Reducing the size of the electrodes tends to increase stresses of and forces applied to the electrode upon engagement with a receiving connector. As a result, the integrity and effectiveness of the connector is reduced over time.

Further, electrical connectors are typically coupled to or part of a cable assembly. Such cable assemblies and electrical connectors often protrude and extend from electronic devices in a disorganized manner. As a result, the electrical connectors and cable assemblies attached thereto are often distracting and unsightly.

SUMMARY

Embodiments of the present invention generally concern electrical connectors, cable assemblies, and connector pins. An electrical connector may include pin-shaped electrodes and be part of a cable assembly while being adapted to be fully insertable into an electronic device and contoured to match an outer surface of the electronic device.

In some embodiments, a cable assembly includes a plug housing, a cable, and a connector base. Various features of the cable assembly may, either alone or in combination with one another, overcome some or all of the above deficiencies in the related art.

For example, the plug housing may include a rear surface that is at least one of curved and angled with respect to a front surface of the plug housing so as to match a contour of an outer surface of an electronic device. In this fashion, a size and visual protrusion of the plug housing may advantageously be minimized. For another example, the plug housing may have a depth and an interior cavity designed to accommodate a number of pins. The pins may each include a connecting portion, and the connecting portions of adjacent pairs of pins may be staggered with respect to one another. In this fashion, an interference between adjacent pins may be advantageously reduced. For yet another example, the connecting portions of pins may extend substantially perpendicular to a rear surface of the plug housing. In this fashion, the integrity of the pins and the integrity of a coupling between the pins and the cable may advantageously be increased.

In other embodiments, a pin is provided for establishing an electrical connection with a receiving pin. Various features of the pin may, either alone or in combination with one another, overcome some or all of the above deficiencies in the related art.

For example, the pin may include a base, an elongated shaft, and an engaging portion. The base may include a cutout for extending a length of the elongated shaft. In this fashion, forces applied to and stresses within the pin may advantageously be reduced. For another example, the elongated shaft may include a limit stop protruding from a top surface of the elongated shaft. The limit stop may distribute a force applied to the elongated shaft upon engagement of the engaging portion with the receiving pin. In this fashion, forces applied to and stresses within the pin may advantageously be reduced.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Embodiments of the invention are discussed below with reference to FIGS. 1A to 7B. However, those skilled in the art will readily appreciate that the detailed description given herein with respect to these figures is for explanatory purposes only as embodiments of the invention extend beyond these limited embodiments.

Figure 1A:
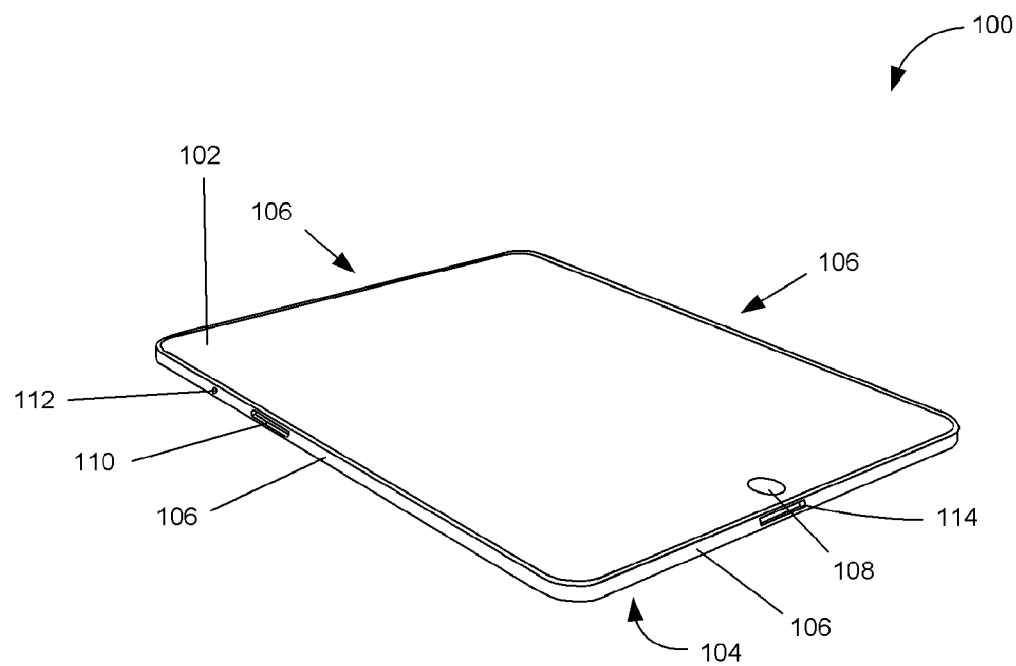
FIG. 1A illustrates a perspective view of an electronic device that may be part of a digital signage system according to an embodiment of the present invention.

FIG. 1A illustrates a perspective view of an electronic device 100 that may be part of a digital signage system according to an embodiment of the present invention. According to this embodiment, electronic device 100 is a tablet computer. For example, electronic device 100 may be an iPad as manufactured by Apple, Inc. of Cupertino, Calif.; a Toshiba Tablet as manufactured by Toshiba Corp. of Tokyo, Japan; a Z-Pad as manufactured by ZTE Corp. of Shenzhen, China; an EEE Pad as manufactured by Asus of Taipei, Taiwan; a Dell Streak as manufactured by Dell of Austin, Tex.; a Samsung Galaxy as manufactured by Samsung Group of Seoul, South Korea; etc. According to other embodiments of the present invention, electronic device 100 is not a tablet computer. Rather, electronic device 100 may be any portable electronic device with a display. For example, electronic device may be a cellular phone, a personal digital assistant (PDA), a media player (e.g., music player or video player), a camera, a game player, a laptop computer, a netbook, a booklet, a slate, a convertible notebook, etc.

Electronic device 100 includes an upper surface 102, a rear surface 104, and side surfaces 106. According to one embodiment, upper surface 102 is a digital display. According to another embodiment, upper surface 102 is a digital display incorporating touch screen functionality, thereby enabling a user to operate electronic device 100 by interacting with the display.

Electronic device 100 may also include various buttons on various surfaces for activating various functionality of the device. For example, electronic device 100 may include a multipurpose button 108 arranged on upper surface 102, a volume up and down button 110 on side surface 106, a volume mute button 112 on side surface 106, a power on and off button (not illustrated) on rear surface 104, etc. Electronic device 100 may also include, on various surfaces, various mechanical interfaces for interfacing with other electronic devices and/or accessories. For example, electronic device 100 may include a receptacle connector 114 on side surface 106 for connecting to other electronic devices via a cable of a cable assembly, an audio jack (not illustrated) on a side surface 106 for connecting to speakers, etc. Electronic device 100 may also include other elements causing protrusions from or indentations into surfaces of electronic device 100, such as camera's, microphones, speakers, antenna's, etc.

Figure 1B:
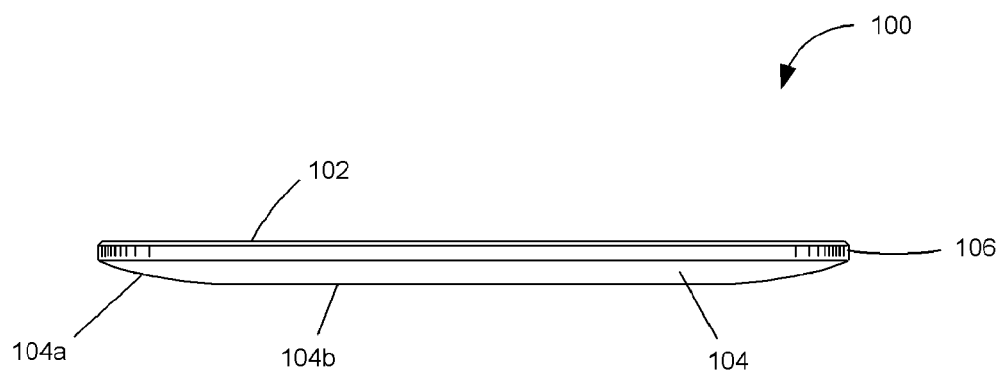
FIG. 1B illustrates a side view of the electronic device shown in FIG. 1A.

FIG. 1B illustrates a side view of the electronic device 100 shown in FIG. 1A. From this view, it is apparent that rear surface 104 is contoured in the shape of a bowl. In some embodiments, rear surface 104 includes curved surfaces 104a and a substantially planar surface 104b. In other embodiments, the entire rear surface 104 is curved such that there are substantially no planar surfaces in rear surface 104.

Rear surface 104 may protrude from side surfaces 106 by a predetermined depth. For example, rear surface 104 may protrude from side surfaces 106 by a depth of approximately 0.15 inches. For another example, rear surface 104 may protrude from side surfaces 106 by a depth in a range of approximately 0.05 inches to 0.25 inches. For yet another example, rear surface 104 may protrude from side surfaces 106 by a depth greater than 0.25 inches or less than 0.05 inches.

Side surfaces 106 may protrude from upper surface 102 by a predetermined depth. For example, side surfaces 106 may protrude from upper surface 102 by a depth of approximately 0.15 inches. For another example, side surfaces 106 may protrude from upper surface 102 by a depth in a range of approximately 0.05 inches to 0.25 inches. For yet another example, side surfaces 106 may protrude from upper surface 102 by a depth greater than 0.25 inches or less than 0.05 inches.

In some embodiments, side surfaces 106 may be arranged substantially perpendicular to upper surface 102. In other embodiments, side surfaces 106 may be arranged at an angle of less than ninety degrees with respect to upper surface 102, such that side surfaces 106 are directed inwards towards a center of electronic device 100. In some embodiments, side surfaces 106 may be substantially planar, while in other embodiments, side surfaces 106 may be curved inwards. In some embodiments, side surfaces 106 are arranged such that they are continuous with rear surface 106; for example, side surfaces 106 may be mechanically coupled with rear surface 104 such that there is no recognizable disjoint between side surfaces 106 and rear surface 104. In other embodiments, there are no side surfaces 106; for example, rear surface 104 may protrude directly from upper surface 102. In some embodiments, side surfaces 106 have substantially identical angles with respect to one another; for example, all side surfaces 106 may be substantially perpendicular to upper surface 102. In other embodiments, side surfaces 106 have different angles with respect to one another; for example, one of side surfaces 106 may be substantially perpendicular to upper surface 102, while another one of side surfaces 106 may be arranged at an angle of less than ninety degrees with respect to upper surface 102.

Figure 2:
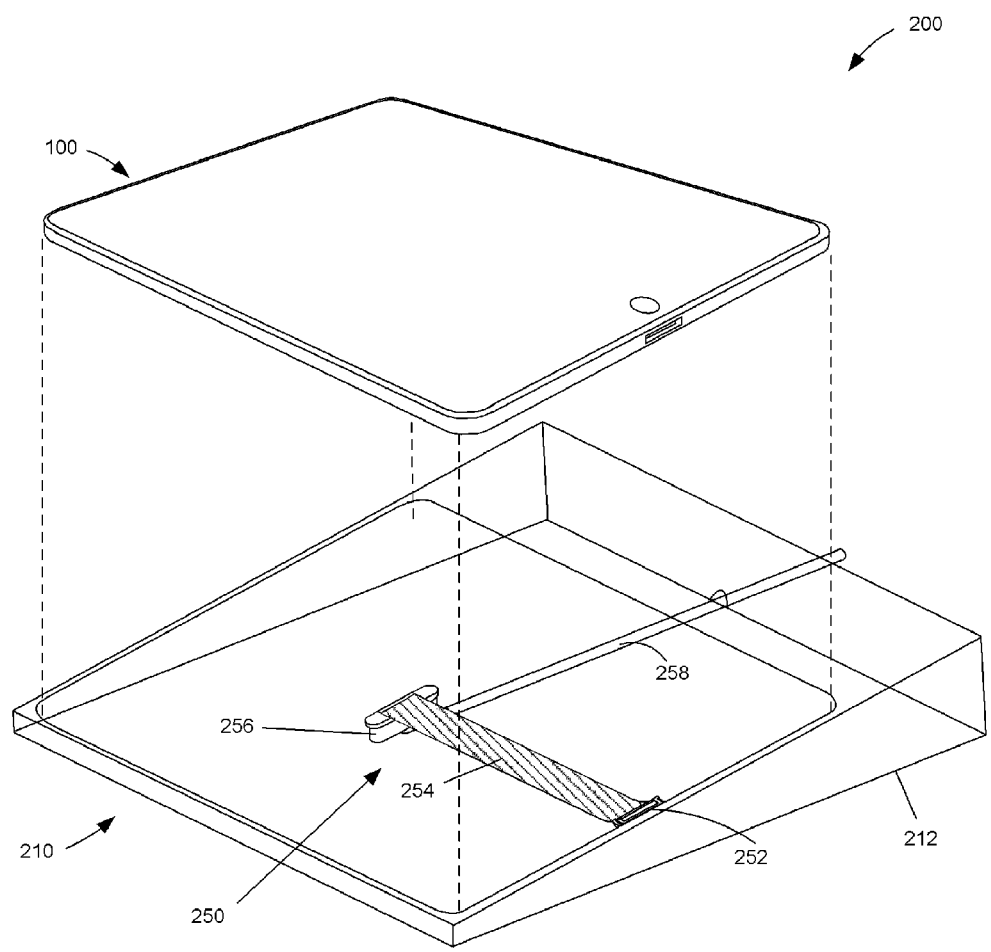
FIG. 2 illustrates a digital signage system including a cable assembly according to an embodiment of the present invention.

FIG. 2 illustrates a digital signage system 200 including a cable assembly 250 according to an embodiment of the present invention. Digital signage system 200 includes an electronic device 100 such as that described with reference to FIGS. 1A and 1B, a docking station 210 for mounting electronic device 100, and cable assembly 250.

Docking station 210 includes a body 212 for supporting electronic device 100. Docking station 210 is further described with reference to FIGS. 3A to 3E. In general, however, body 212 includes a top surface having a recessed region formed therein. The recessed region is shaped to receive electronic device 100 such that when electronic device 100 is positioned within the recessed region, rear surface 104 of electronic device 100 fits entirely within the recessed region while upper surface 102 of electronic device 100 is substantially flush with a portion of the top surface of body 212 that surrounds the recessed region. As previously discussed, in some embodiments, electronic device 100 may include side surfaces 106. Accordingly, in some embodiments, the recessed region of body 212 may be shaped to receive electronic device 100 such that when electronic device 100 is positioned within the recessed region, one or more or all of side surfaces 106 of electronic device 100 abut a surface of the recessed region.

Cable assembly 250 may include a plug housing 252 sized for insertion into receptacle connector 114 of electronic device 100. Plug housing 252 may be designed to accommodate a number of pins which, when plug housing 252 is engaged with electronic device 100, make an electrical contact with a number of pins arranged within receptacle connector 114. Plug housing 252 is further described with reference to FIGS. 5A to 6B. In one embodiment, plug housing 252 may be designed so as to fit entirely within receptacle connector 114 and have a rear surface that is contoured to and flush with an outer surface (e.g., at least one of rear surface 104 and side surfaces 106) of electronic device 100. The one or more pins accommodated in plug housing 252 are further described with reference to FIGS. 5A to 7B.

Cable assembly 250 may also include a cable 254 mechanically connected to plug housing 252. For example, an end of cable 254 may be bonded to a surface of plug housing 252. Cable 254 may have one or more conductive traces formed thereon that correspond to and are electrically coupled to the pins located in plug housing 252. For example, the pins located in plug housing 252 may each include a connecting portion that protrudes from plug housing 252. Cable 254 may include holes sized to fit those connecting portions of the pins which protrude from plug housing 252. Cable 254 may then be arranged such that, after fitting the connecting portions through the holes of cable 254, the connecting pin portions and holes are soldered so as to establish an electrical connection between the pins and conductive traces electrically coupled to the holes.

Cable 254 may be any thin cable. For example, cable 254 may be a single or multi-core cable in which the cores or electric conductors are guided parallel and adjacent to one another. Cable 254 may include flat conductive traces or strips. Each strip may have a cross section of any shape, such as circular, oval, square, rectangular, etc. The conductive traces or strips may be made of any conductive material. For example, they may be made of tin, copper, etc. The conductive traces or strips may be insulated using any insulating material, such as polyester, dielectric polymers, etc. In some embodiments, cable 254 should be thin enough so as not to interfere with or perturb electronic device 100 when electronic device 100 is arranged in the recessed region of body 212. For example, cable 254 may have a diameter of 0.8 mm, or in a range of 0.5 mm to 1 mm, or less than 0.5 mm or greater than 1 mm. Cable 254 may have a cross section of any shape, such as circular, oval, square, rectangular, etc. According to some embodiments, cable 254 may be flexible or stiff. For example, in one embodiment cable 254 may be a substantially flat flex cable. In another embodiment, cable 254 may be a rounded or otherwise thicker cable that runs through a channel (not shown) in body 212 to connect plug housing 252 to connector base 256.

Cable 254 may be arranged between electronic device 100 and the recessed region of body 212, and extend from an aperture of body 212 to an edge of electronic device 100 (e.g., an edge of upper surface 102, a location on a side surface 106, or an edge of side surface 106). For example, cable 254 may extend from the aperture to side 106 including receptacle connector 114. Cable 254 may also extend in a direction substantially parallel to the one or more pins accommodated in plug housing 252 and toward receptacle connector 114. Plug housing 252 may be mechanically coupled to an end of cable 254 proximate to an edge of electronic device 100. For example, plug housing 252 may be mechanically coupled to an end of cable 254 proximate to side 106 including receptacle connector 114. The aperture of body 212 is further described with reference to FIGS. 3A to 3E.

Cable assembly 250 may also include a connector base 256. Connector base 256 may include a printed circuit board (not illustrated) having one or more connection pads formed thereon. The connection pads may be electrically coupled to respective ones of the conductive traces of cable 254. Connector base 256 may be arranged in the aperture of body 212. For example, connector base 256 may be arranged to partially extend into body 212. For another example, connector base 256 may be arranged to fully extend through body 212. Connector base 256 may be mechanically coupled to plug housing 252 via cable 254. For example, connector base 256 may be bonded to an end of cable 254 opposite an end which plug housing 252 is bonded. In some embodiment, connector base 256 is coupled to plug housing 252 only by cable 254.

Cable assembly 250 may also include a wire 258 that, in some embodiments, may be insulated. Wire 258 may include a number of (in some embodiments, insulated) wires, where at least one of the wires is coupled to the connection pads in connector base 256. Further, wire 258 may be arranged in an elongated cutout of docking station 210 extending from the aperture to an edge or edge surface of body 212. For example, wire 258 may be located in an elongated cutout extending within body 212. For another example, wire 258 may be located in an elongated cutout extending along a bottom surface of body 212. The elongated cutout of body 212 is further described with reference to FIGS. 3A to 3E.

In some embodiments, digital signage system 200 includes one or more flexible pads (not shown) disposed between electronic device 100 and docking station 210. The pads may be made from any type of flexible material; for example, they may be made from silicon, rubber, cloth, soft plastic, etc. The pads may function to secure electronic device 100 to docking station 210. For example, the pads may be bonded to both electronic device 100 and docking station 210 so as to mechanically couple electronic device 100 to docking station 210. The pads may also function to enable activation of buttons arranged on rear surface 104 of electronic device 100. For example, one or more pads may be flexible so that a force applied on upper surface 102 of electronic device 100 causes one or more of pads to deform, thereby causing a button located on rear surface 104 to engage with a surface of the recessed region of docking station 210.

In other embodiments, there are no pads. Rather, electronic device 100 may be mechanically coupled to docking station 210 via other means; for example, electronic device 100 may be glued or bonded to docking station 210; for another example, clamps may be provided for mechanically coupling electronic device 100 to docking station 210. In other embodiments, electronic device 100 is arranged in the recessed region of docking station 210 without a mechanical coupling; for example, the recessed region of docking station 210 may be sized such that electronic device 100 securely fits within the recessed region; for another example, electronic device 100 may be secured to docking station 210 via the effect of gravity. In yet other embodiments, both pads and other means for mechanically coupling electronic device 100 to docking station 210 are provided.

Figure 3A:
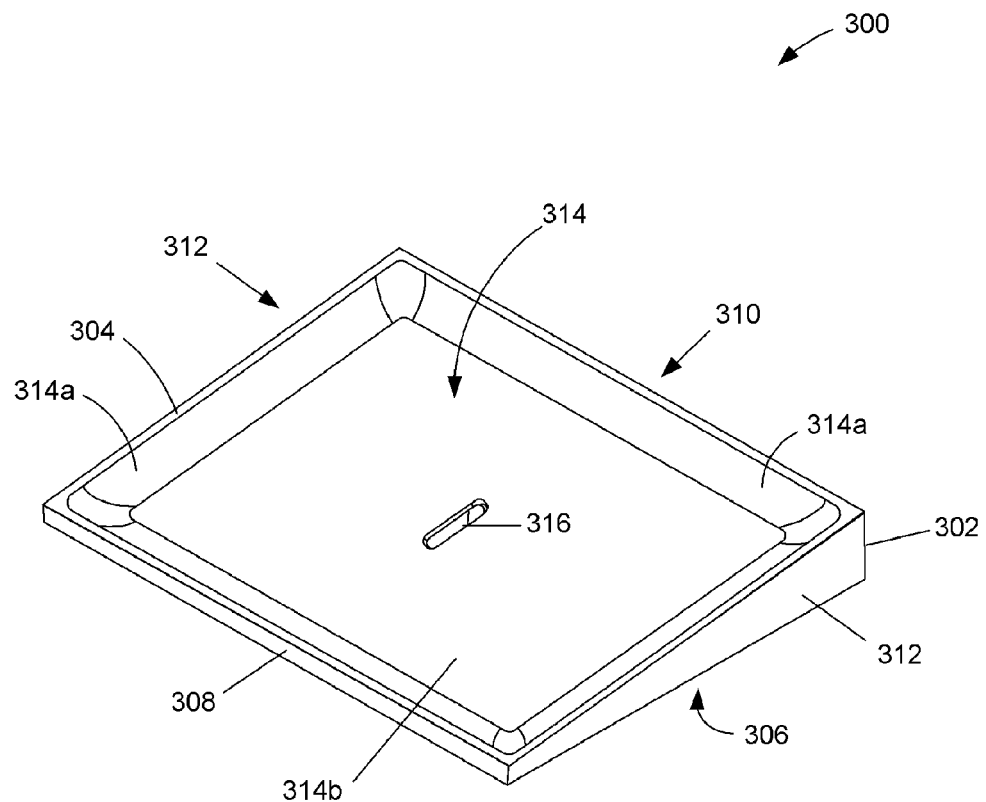
FIG. 3A illustrates a perspective view of a docking station for receiving a cable assembly according to an embodiment of the present invention.

FIG. 3A illustrates a perspective view of a docking station 300 for receiving a cable assembly according to an embodiment of the present invention. As shown in FIG. 3A, docking station 300 includes a body 302. In some embodiments, body 302 is substantially transparent; in other embodiments, body 302 is opaque. A substantially transparent body 302 formed in accordance with some embodiments of the present invention may advantageously result in various elements being hidden from view depending on the angle of view. For example, upon viewing a side of transparent body 302, a user may not be able to view portions of a cable assembly due to light refractions caused by the geometry of body 302.

In some embodiments, body 302 may be made from any materials suitable for forming a substantially solid entity. In other embodiments, body 302 may be made from any materials suitable for forming a malleable and/or flexible entity.

For example, body 302 may be made from any suitable metal, minerals, ceramic, glass ceramic, wood, polymers, composite materials, semiconductors, nanomaterials, or biomaterials. According to one embodiment, body 302 is made from acrylic or an acrylic equivalent. According to another embodiment, body 302 is made from combinations of the above materials.

Body 302 includes a top or upper surface 304, a bottom surface 306, a front (or side) surface 308, a back (or side) surface 310, and side surfaces 312. Body 302 also includes a recessed region 314 formed at upper surface 304.

Recessed region 314 is shaped to receive an electronic device such that, when the electronic device is positioned in the recessed region, an exposed surface such as a display of the electronic device is substantially flush with a peripheral portion of the upper surface that surrounds the recessed region. For example, recessed region 314 may be shaped to form a substantially mirror image of rear surface 104, and optionally side surfaces 106, of electronic device 100. By forming recessed region 314 to have such a shape, when electronic device 100 is positioned within recessed region 314, upper surface 102 of electronic device 100 may be substantially flush with a peripheral portion of upper surface 304 that surrounds the recessed region. Further, when electronic device 100 is positioned within recessed region 314, the entire rear surface 104, and optionally the entire side surfaces 106, of electronic device 100 will abut a surface of recessed region 314.

According to one embodiment, recessed region 314 includes curved surfaces 314a and a substantially planar surface 314b. For example, curved surfaces 314a may be shaped to receive curved surfaces 104a of electronic device 100, and substantially planar surface 314b may be shaped to receive substantially planar surface 104b of electronic device 100.

According to another embodiment, recessed region 314 does not include a substantially planar surface. Rather, the entire recessed region 314 is curved such that there are substantially no planar surfaces in recessed region 314. For example, where electronic device 100 includes an entire rear surface 104 that is curved such that there are substantially no planar surfaces in rear surface 104, recessed region 314 may be contoured accordingly such that the entire recessed region 314 is curved to match rear surface 104 of electronic device 100.

Recessed region 314 may be arranged to receive electronic devices having exposed surfaces of a variety of shapes. For example, recessed region 314 may be contoured to receive electronic device 100 having a rectangular upper surface 102. Other shapes of upper surface 102 that recessed region 314 may be adapted to receive include square, circular, oval, etc.

Upper surface 304 may be sloped upwards from front surface 308 to back surface 310 so that recessed region 314 is accordingly sloped upwards from front surface 308 to back surface 310. For example, a height of side surfaces 312 arranged proximate to front surface 308 may be smaller than a height of side surfaces 312 arranged proximate to back surface 310. As a result, upper surface 304 may be sloped upwards from front surface 308 to back surface 310 with respect to bottom surface 306. In some embodiments, upper surface 304 may be sloped upwards at an angle of approximately 7° with respect to bottom surface 306. In other embodiments, upper surface 304 may be sloped upwards at an angle in the range of approximately 4° and 10°. In yet other embodiments, upper surface 304 may be sloped upwards at an angle of less than 4° or greater than 10°. By angling upper surface 304 with respect to bottom surface 306, visibility of an exposed surface of a mounted electronic device 100 (e.g., upper surface 102) may be increased when docking station 300 is disposed on a horizontal surface.

Docking station 300 may include an aperture 316 formed at least partially through body 302 from recessed region 314 toward bottom surface 306. In one embodiment, aperture 316 extends only partially into body 302 such that aperture 316 terminates within body 302. In another embodiment, aperture 316 extends entirely through body 302 such that aperture 316 terminates at bottom surface 306 of body 302.

Aperture 316 may be sized to receive a cable assembly operable to connect to an electronic device when the electronic device is mounted within the recessed region. For example, aperture 316 may have a mirror-image shape of connector base 256 and have a diameter larger than a diameter of at least one of plug housing 252 and wire 258. In this fashion, at least one of plug housing 252 and wire 258 can pass through aperture 316 while connector base 256 may fit snugly within aperture 316.

Docking station 300 may include an elongated cutout (not illustrated in FIG. 3A) extending from aperture 316 to an edge (e.g., edges of front surface 308, back surface 310, or side surfaces 312) or edge surface (e.g., front surface 308, back surface 310, or a side surface 312) of body 302. The elongated cutout may be sized so that a cable of a cable assembly can fir within the aperture. For example, the elongated cutout may be sized to receive wire 258.

According to one embodiment, the elongated cutout extends within body 302. For example, where aperture 316 terminates within body 302, the elongated cutout may extend from the point of termination within body 302 to back surface 310 of body 302. According to another embodiment, the elongated cutout extends along bottom surface 306 of body 302. For example, where aperture 316 terminates at bottom surface 306 of body 302, the elongated cutout may extend from the point of termination at bottom surface 306 of body 302 to a bottom edge of body 302.

Figure 3B:
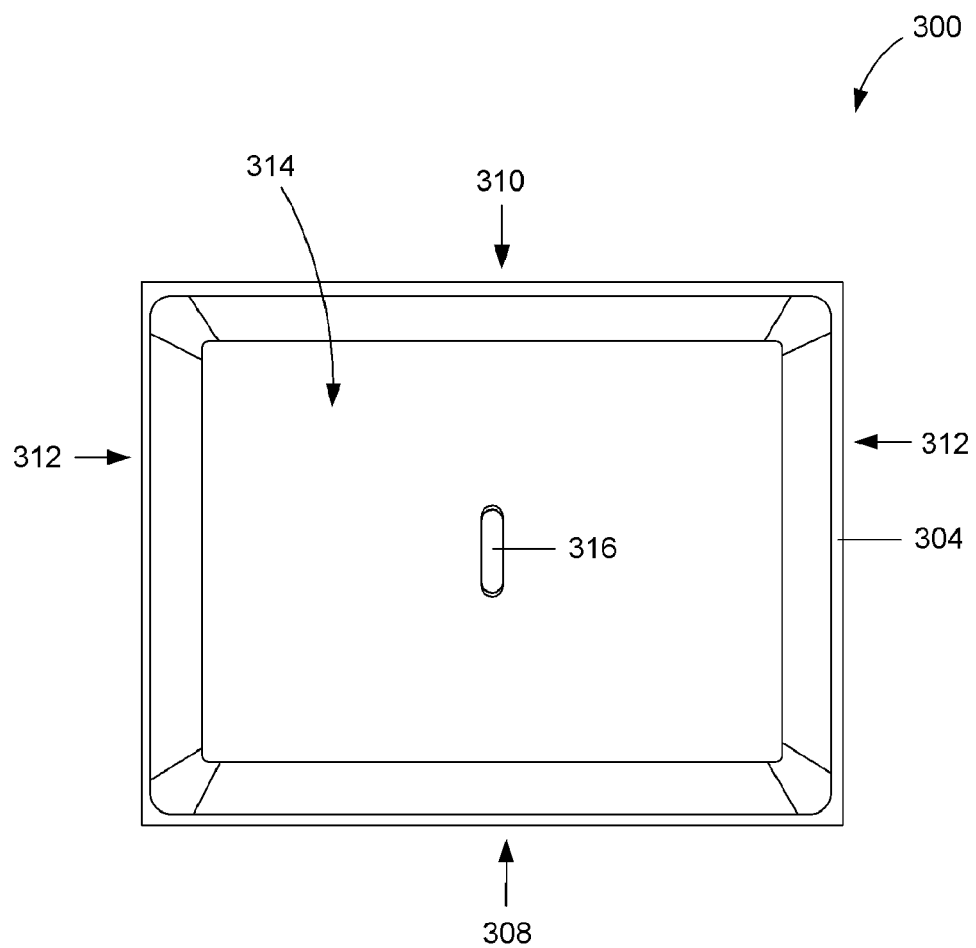
FIG. 3B illustrates a top view of the docking station shown in FIG. 3A.

FIG. 3B illustrates a top view of the docking station 300 shown in FIG. 3A. From the top view, it is apparent that recessed region 314 may be contoured to receive electronic device 100 having a substantially rectangular upper surface 102. Corners of recessed region 314 and upper surface 304 may be rounded or at substantially perpendicular angles.

Aperture 316 may be provided at any location within recessed region 314. According to one embodiment, aperture 316 is located at a center of recessed region 314. According to other embodiments, aperture 316 is provided at a location offset from the center of recessed region 314; for example, aperture 316 may be provided at a location closer to front surface 308 than back surface 310, closer to back surface 310 than front surface 308, and/or closer to a side surface 312 than another side surface 312.

Aperture 316 may be arranged in any orientation within recessed region 314. According to one embodiment, aperture 316 is arranged such that side surfaces of aperture 316 are parallel to side surfaces 312. According to other embodiments, aperture 316 is arranged such that side surfaces of aperture 316 are arranged at an angle between 0 and 90 degrees from side surfaces 314.

Figure 3C:
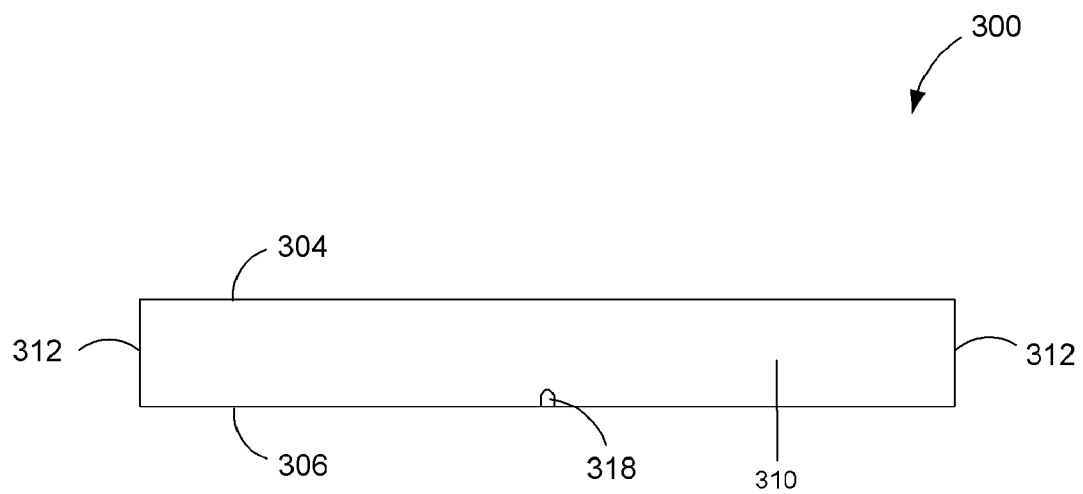
FIG. 3C illustrates a back view of the docking station shown in FIG. 3A.

FIG. 3C illustrates a back view of the docking station 300 shown in FIG. 3A. From the back view, an end portion of elongated cutout 318 may be seen. According to the embodiment illustrated in FIG. 3C, elongated cutout 318 extends along bottom surface 306 of body 302. According to another embodiment, as previously discussed, elongated cutout 318 may extend within body 302. In such a case, the end portion of elongated cutout 318 may appear as a circle arranged on back surface 310 between (but not in contact with) upper surface 304 and bottom surface 306.

As previously discussed, elongated cutout 318 may be sized to receive wire 258. In one embodiment, wire 258 has a substantially circular cross section, and elongated cutout 318 has a substantially circular cross section having a diameter slightly greater than the diameter of the wire 258. For example, the diameter of elongated cutout 318 may be approximately 10% greater than the diameter of wire 258. The diameter of elongated cutout 318 may alternatively be greater than the diameter of wire 258 by an amount less than or greater than 10%. In another embodiment, elongated cutout 318 has a cross section having a curved portion and planar portions. The smallest diameter of elongated cutout 318 may be greater than the largest diameter of wire 258. In other embodiments, wire 258 has a cross section of different shapes; for example, wire 258 may have an oval cross section, square cross section, rectangular cross section, etc. Elongated cutout 318 may then similarly be shaped and sized to match the size and shape of wire 258.

Figure 3D:
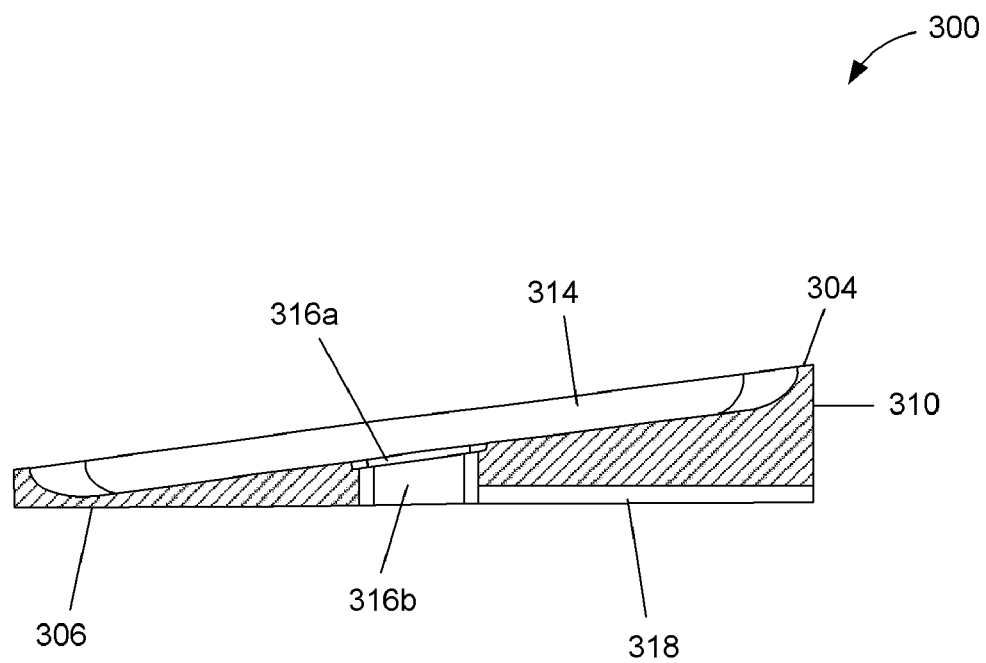
FIG. 3D illustrates a side view of the docking station shown in FIG. 3A.

FIG. 3D illustrates a side view of the docking station 300 shown in FIG. 3A. From the side view, elongated cutout 318 may be seen. According to the embodiment illustrated in FIG. 3D, elongated cutout 318 extends along bottom surface 306 from aperture 316 to back surface 310. According to another embodiment, as previously discussed, elongated cutout 318 may extend within body 302. In such a case, elongated cutout 318 may be vertically displaced from bottom surface 306 such that elongated cutout 318 is arranged between (but not in contact with) upper surface 304 and bottom surface 306.

As previously discussed, docking station 300 may include an aperture 316 formed at least partially through body 302 from recessed region 314 toward bottom surface 306. According to the embodiment illustrated in FIG. 3D, aperture 316 extends entirely through body 302 such that aperture 316 terminates at bottom surface 306 of body 302. According to another embodiment, as previously discussed, aperture 316 may extend only partially into body 302 such that aperture 316 terminates within body 302. In such a case, aperture 316 may be vertically displaced from bottom surface 306 such that aperture 316 is arranged between recessed region 314 and bottom surface 306 but not in contact with bottom surface 306.

As also previously discussed, aperture 316 may be sized to receive a cable assembly operable to connect to an electronic device when the electronic device is mounted within the recessed region. In one embodiment, aperture 316 includes a first portion 316a and a second portion 316b. First portion 316a is recessed from recessed region 314 and extends from recessed region 314 toward bottom surface 306, while second portion 316b is recessed from first portion 316a and extends from bottom surface 306 toward recessed region 314. A diameter of first portion 316a may be greater than a diameter of second portion 316b. Further, an upper portion of connector base 256 may have a diameter greater than a diameter of a lower portion of connector base 256. First portion 316a may be sized to receive the upper portion of connector base 256, while second portion 316b may be sized to receive the lower portion of connector base 256. In this fashion, when aperture 316 receives connector base 256, a top surface of connector base 256 may be substantially flush with a surface of recessed region 314.

Figure 3E:
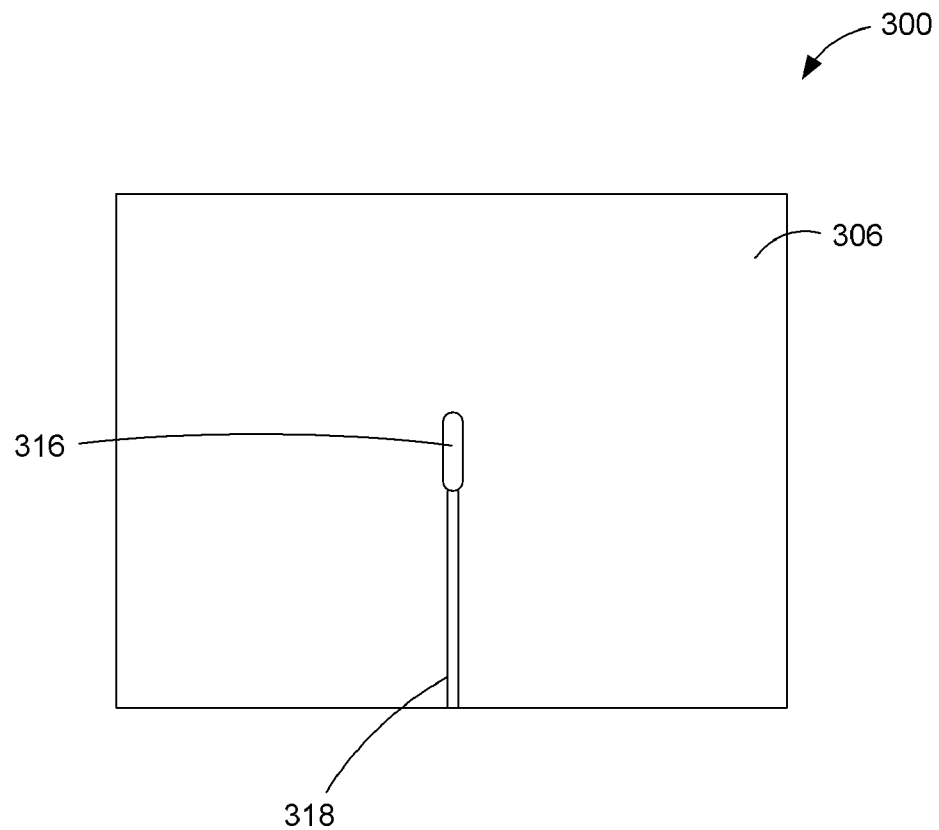
FIG. 3E illustrates a bottom view of the docking station shown in FIG. 3A.

FIG. 3E illustrates a bottom view of the docking station 300 shown in FIG. 3A. From the bottom view, aperture 316 and elongated cutout 318 may be seen. According to the embodiment illustrated in FIG. 3E, aperture 316 extends entirely through body 302 and elongated cutout 318 extends along bottom surface 306 from aperture 316 to back surface 310. According to another embodiment, as previously discussed, aperture 316 may extend only partially into body 302 and elongated cutout 318 may extend within body 302. In such a case, neither aperture 316 nor elongated cutout 318 would be seen in this view.

Other features and aspects of digital signage systems, electronic devices, docking stations, and cable assemblies are further described in U.S. patent application Ser. No. 13/112,999, filed May 20, 2011, now U.S. Pat. No. 8,659,889, issued Feb. 25, 2014, which is commonly assigned and incorporated herein by reference in its entirety.

Figure 4:
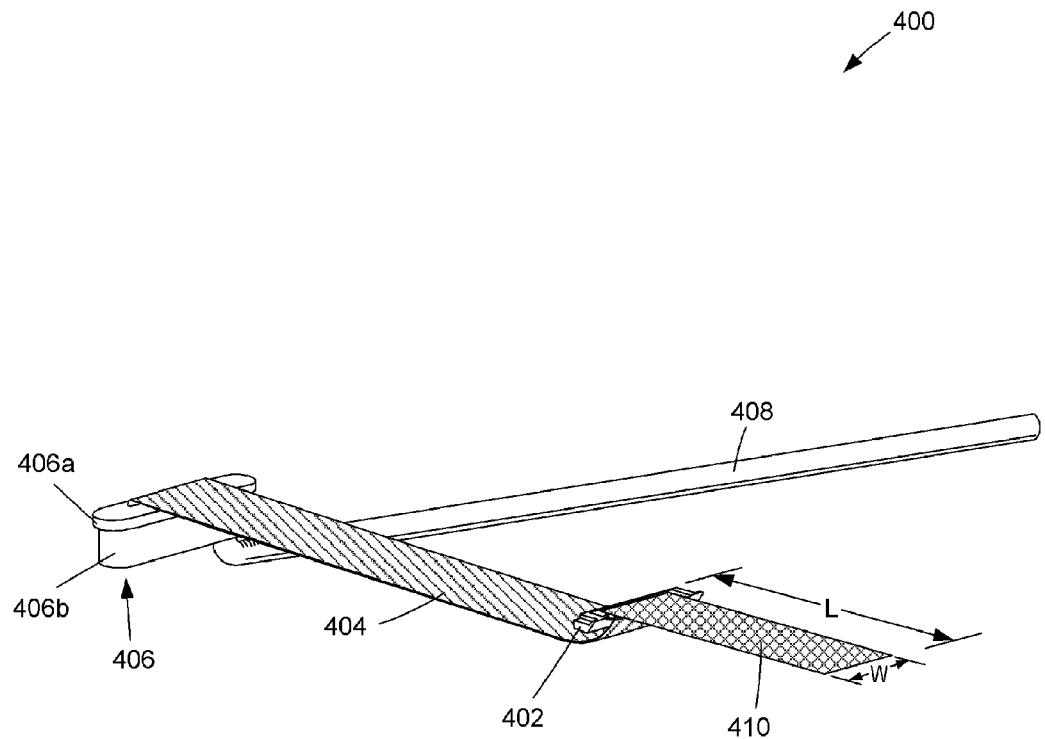
FIG. 4 illustrates a cable assembly according to an embodiment of the present invention.

FIG. 4 illustrates a cable assembly 400 according to an embodiment of the present invention. Cable assembly 400 may include a plug housing 402, a cable 404, a connector base 406, a wire 408, and a pull tab 410. Plug housing 402, cable 404, connector base 406, and wire 408, may include some or all of the characteristics of plug housing 252, cable 254, connector base 256 and wire 258 previously discussed.

Additionally or alternatively, connector base 406 may include an upper portion 406a and a lower portion 406b. An upper surface of upper portion 406a may receive an end of cable 404. For example, upper portion 406a may include a slot for receiving cable 404. In some embodiments, an end of cable 404 may be bonded to a printed circuit board included within connector base 406. In other embodiments, cable 404 may be bonded to a slot of connector base 406. A lower surface of lower portion 406b may receive wire 408. For example, lower portion 406b may include a slot for receiving wire 408. In some embodiments, an end of wire 408 may be bonded to a printed circuit board included within connector base. In other embodiments, wire 408 may be bonded to the slot of connector base 406.

Wire 408 may include one or more wires. The one or more wires may be bonded to a printed circuit board located in connector base 406. In some embodiments, each of the one or more wires is surrounded by an insulating sheath. In other embodiments, the one or more wires are individually insulated and bundled together within an additional insulating sheath. Any portion of wire 408 may be bonded to lower portion 406b of connector base 406. For example, an additional insulating sheath bundling together a number of wires may be bonded to connector base 406.

Pull tab 410 is a flat, flexible element mechanically coupled to an electrical connector and operable to disconnect the electrical connector from an electronic device. For example, pull tab 410 may be mechanically coupled to plug housing 402 and operable to remove plug housing 402 from receptacle connector 114. As previously mentioned, plug housing 402 may be designed so as to fit entirely within receptacle connector 114 and have a rear surface that is contoured to and flush with an outer surface of electronic device 100. By way of such a design, the provision of pull tab 410 may advantageously increase the ease of removing plug housing 402 from receptacle connector 114.

In one embodiment, pull tab 410 includes a first portion and a second portion. The first portion is mechanically coupled to a surface of plug housing 402 oriented in parallel with pins arranged within plug housing 402. For example, the first portion may be bonded to a top surface of plug housing 402. For another example, the first portion may be bonded to a surface within plug housing 402. For yet another example, the first portion may be formed as part of plug housing 402. The second portion extends from the first portion. Pull tab 410 may be any type of flexible element. For example, pull tab 410 may be a ribbon, a tape-like structure, or a woven band. Pull tab 410 may be made using any type of material resulting in a flexible element. For example, pull tab 410 may be made using silicon, rubber, cloth, soft plastic, etc.

By way of its flexibility, the second portion of pull tab 410 may be arranged in a same plane as the first portion. For example, the second portion may extend from the first portion in parallel with pins arranged within plug housing 402. In this fashion, a force applied to pull tab 410 to remove plug housing 402 from receptacle connector 114 may reduce a risk of damage to pins arranged within plug housing 402 arising from removal of the electrical connector from the electronic device.

Further by way of its flexibility, the second portion of pull tab 410 is operable to curve around a rear surface of plug housing 402 and a bottom surface of plug housing 402. For example, pull tab 410 may curve around the rear and bottom surfaces of plug housing 402 and extend parallel with and substantially adjacent to cable 404. In this fashion, pull tab 410 may be hidden from view if cable assembly 400 is incorporated into a digital signage system.

Pull tab 410 may be of any shape and dimension enabling a user to disconnect the electrical connector from the electronic device. For example, pull tab 410 may be rectangular, square, oval, etc. Pull tab 410 may have a width W extending across an entire upper surface of plug housing 402. Alternatively, pull tab 410 may have a width W extending across only a portion of upper surface of plug housing 402. In one embodiment, pull tab 410 has a width W approximately equal to 2 cm. In another embodiment, pull tab 410 has a width W approximately equal to 1 cm or 3 cm. In another embodiment, pull tab 410 has a width W in a range between 0.5 cm and 5 cm. In yet another embodiment, pull tab 410 has a width W less than 0.5 cm or greater than 5 cm. In one embodiment, pull tab 410 has a length L approximately equal to 10 cm. In a further embodiment, pull tab 410 has a length L approximately equal to 20 cm. In another embodiment, pull tab 410 has a length L in a range between 5 cm and 30 cm. In yet another embodiment, pull tab 410 has a length L less than 5 cm or greater than 30 cm.

In some embodiments, pull tab 410 may be temporarily bonded to cable 404 via an adhesive or other bonding agent. For example, pull tab 410 may be temporarily bonded to cable 404 such that pull tab 410 curves around the rear and bottom surfaces of plug housing 402 and extends parallel with and substantially adjacent to cable 404. By way of such temporary bonding, an interference of pull tab 410 during insertion of plug housing 402 in a receptacle connector may advantageously be reduced.

Figure 5A:
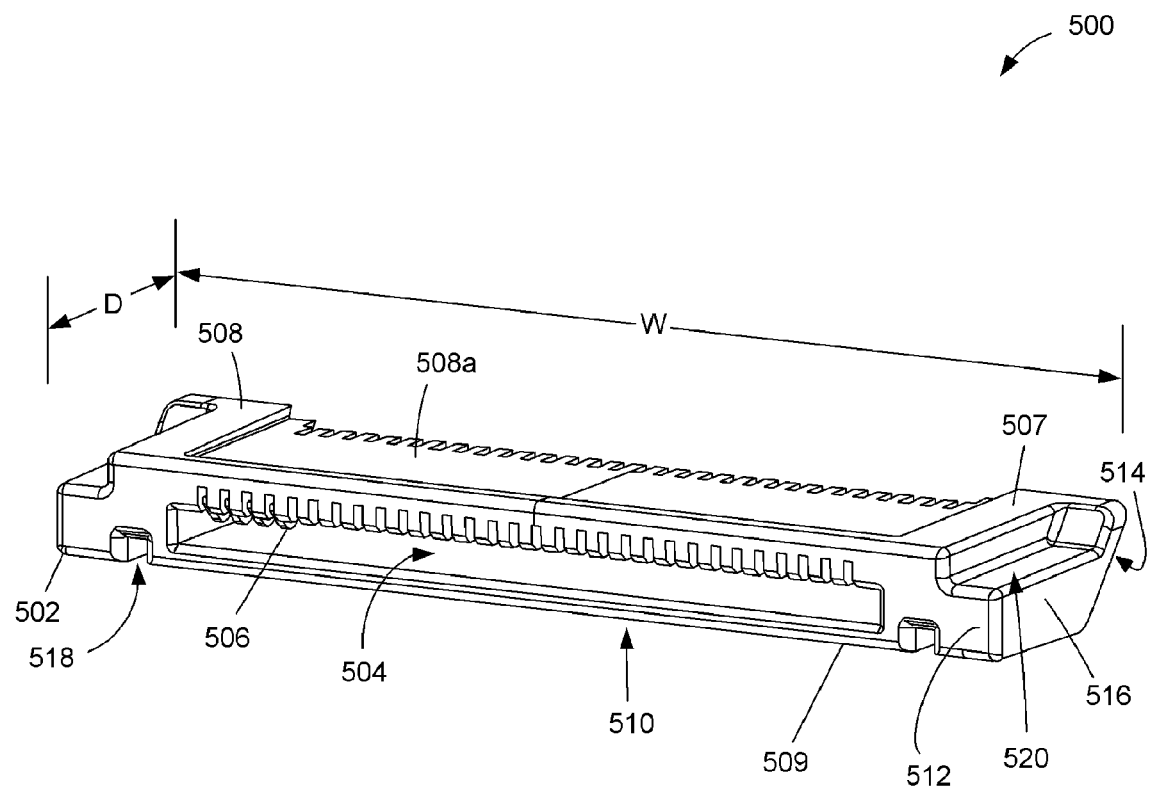
FIG. 5A is a front perspective view of an electrical plug connector according to an embodiment of the present invention.

FIG. 5A is a front perspective view of an electrical plug connector 500 according to an embodiment of the present invention. Electrical connector 500 includes a plug housing 502 having a depth D and an interior cavity 504 designed to accommodate one or more pins 506 that extend within interior cavity 504 in a direction of depth D. Plug housing 502 includes a top surface 508, bottom surface 510, front surface 512, rear surface 514, and side surfaces 516. Rear surface 514 extends between top surface 508 and bottom surface 510. Top surface 508, bottom surface 510, front surface 512, and side surfaces 516 may engage with and contact interior surfaces of receptacle connector 114 upon connecting plug connector 500 to electronic device 100. Upon such a connection, rear surface 514 may be exposed. According to one embodiment, side surfaces 516 are substantially parallel to each other. According to other embodiments, side surfaces 516 are sloped at an angle greater than 0 degrees with respect to one another. According to one embodiment, top surface 508 and bottom surface 510 are substantially parallel to each other. According to other embodiments, top surface 508 and bottom surface 510 are sloped at an angle greater than 0 degrees with respect to one another.

Plug housing 502, and accordingly the surfaces and interior cavity 504 of plug housing 502, are shaped to fit a receptacle connector such as receptacle connector 114 of electronic device 100. Plug housing 502 may include various features for increasing the quality of fit with receptacle connector 114. For example, plug housing 502 may include a pair of elongated slots 518 extending from front surface 512 along the direction of depth D and along bottom surface 510. Elongated slots 518 may receive projections from receptacle connector 114, and may be arranged in parallel with each other and/or in parallel with side surfaces 516. Elongated slots 518 may include cutouts from bottom surface 510 having a cross section of any shape for receiving corresponding projections, such as a rectangular cross section, circular cross section, etc. In one embodiment, elongated slots 518 extend partially through plug housing 502 toward rear surface 514. In another embodiment, elongated slots 518 extend entirely through plug housing 502 to rear surface 514.

Plug housing 502 may include additional or alternative various features for increasing the quality of fit with receptacle connector 114. For example, plug housing 502 may include a pair of recessed portions 520 extending from front surface 512 along the direction of depth D and along top surface 508. Recessed portions 520 may receive projections from receptacle connector 114, and may be arranged in parallel with each other and/or in parallel with side surfaces 516. Recessed portions 520 may include cutouts from top surface 508 having a cross section of any shape for receiving corresponding projections, such as a rectangular cross section, circular cross section, etc. In one embodiment, recessed portions 520 extend partially through plug housing 502 toward rear surface 514. In another embodiment, recessed portions 520 extend entirely through plug housing 502 to rear surface 514.

According to one embodiment, plug housing 502 includes a top plate 507 and a bottom plate 509. The top and bottom plates extend between side surfaces 516, and rear surface 514 extends from top plate 507 to bottom plate 509. Interior cavity 504 is formed between the top and bottom plates and extends from a front edge of plug housing 502 in a direction of depth D. Interior cavity 504 is designed to accommodate one or more pins 506. For example, pins 506 may include a number of pins positioned in pin locations spaced apart in a single row along width W of plug housing 502. For each pin 506, top plate 507 may include a cutout thereby enabling the pin to flex upon engagement with a receiving pin in receptacle connector 114. Bottom plate 509 may include, within cavity 504, a substantially planar top surface for engaging a projecting portion of receptacle connector 114.

Elongated slots 518 may be formed on bottom plate 509 between interior cavity 504 and sides 516 and extend from a front edge of plug housing 502 in a direction of depth D. For example, a first one of elongated slots 518 may be formed between a first side of plug housing 502 and interior cavity 504, and a second one of elongated slots 518 may be formed between a second side of plug housing 502 and interior cavity 504, where the second side is opposite the first side.

Recessed portions 520 may be formed at an outer edge of the top plate on sides 516 and extend from a front edge of plug housing 502 in a direction of depth D. For example, a first one of recessed portions 520 may be formed at an outer edge of top plate 507 on the first side of plug housing 502 and a second one of recessed portions 520 may be formed at an outer edge of top plate 507 on the second side of plug housing 502.

Plug housing 502 may have cross sections of a variety of shapes. For example, in a plane parallel to top surface 508, bottom surface 510, front surface 512 or rear surface 514, plug housing 502 may have a substantially rectangular cross section. In a plane parallel to side surfaces 516, plug housing 502 may have a substantially trapezoidal cross section.

One or more pins 506 may comprise one or more electrical conductors. In one embodiment, one or more pins includes 30 pins. In another embodiment, one or more pins includes less than 30 pins; for example, one or more pins may include 9 pins. In yet another embodiment, one or more pins include more than 30 pins. One or more pins 506 may be used for communicating electrical signals representing any type of data. For example, one or more pins 506 may include first and second differential data pins for communicating a data stream, a ground pin for providing a ground voltage, a power pin for providing a voltage, etc.

According to some embodiments, the first portion of pull tab 410 may be bonded to some or all of top surface 508 or to some or all of top plate 507. According to other embodiments, a portion of top surface 508 or a portion of top plate 507 is recessed so as to form a recessed portion 508a. In such embodiments, the first portion of pull tab 410 may be bonded to some or all of recessed portion 508a.

Figure 5B:
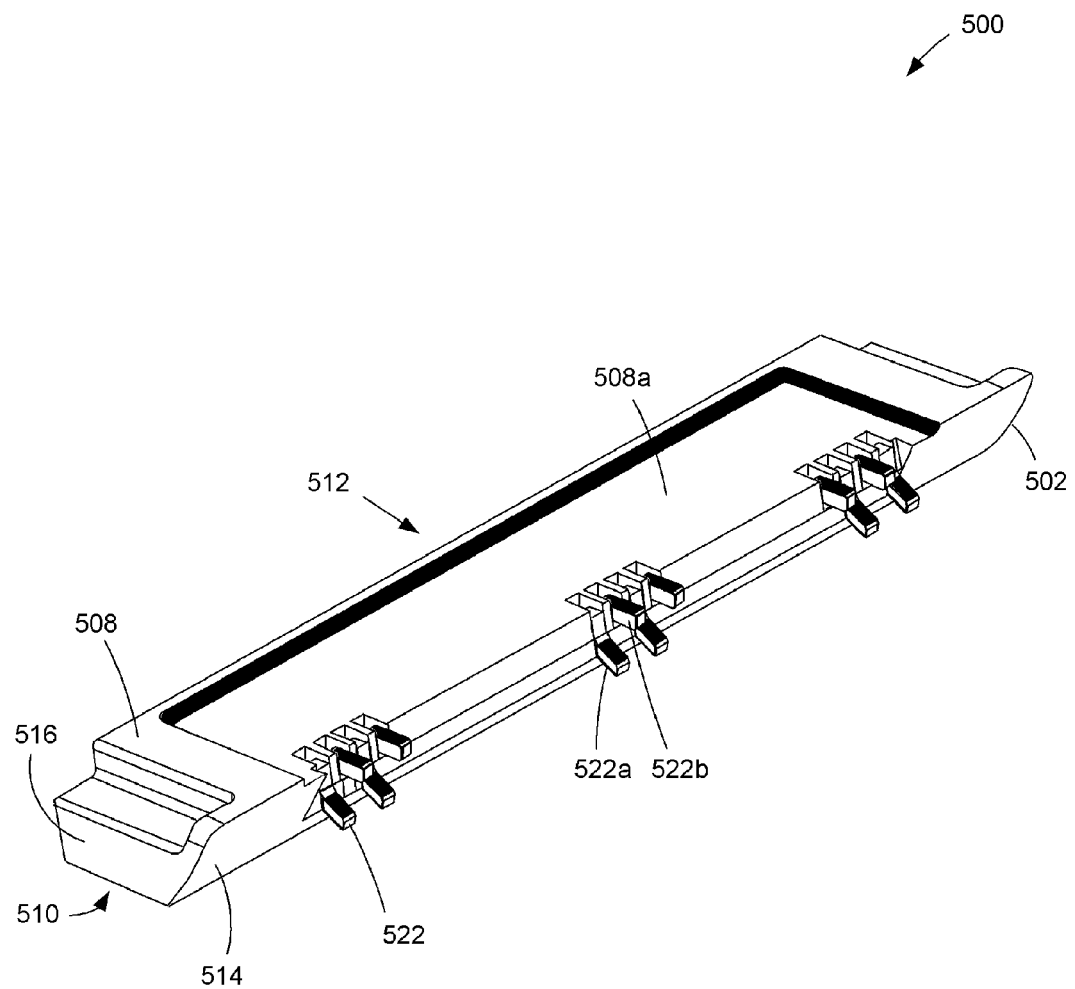
FIG. 5B is a back perspective view of an electrical plug connector according to an embodiment of the present invention.

FIG. 5B is a back perspective view of an electrical plug connector 500 according to an embodiment of the present invention. As previously mentioned, rear surface 514 extends between top surface 508 and bottom surface 510. In one embodiment, rear surface 514 is angled with respect to front surface 512. For example, as illustrated in FIG. 5B, rear surface 514 may be angled such that a depth of plug housing 502 at top surface 508 is greater than a depth of plug housing 502 at bottom surface 510. For another example, rear surface 514 may be angled such that a depth of plug housing 502 at top surface 508 is less than a depth of plug housing 502 at bottom surface 510. In some embodiments, rear surface 514 is not angled with respect to front surface 512. For example, rear surface 514 may be substantially perpendicular to at least one of top surface 508 and bottom surface 510. In some embodiments, plug housing 502 may include a top plate and a bottom plate as previously discussed. In such cases, rear surface 514 may be angled such that a depth of plug housing 502 at top plate 507 is greater or less than a depth of plug housing 502 at bottom plate 509. For example, rear surface 514 may be angled inwardly from top plate 507 to bottom plate 509. In other embodiments, rear surface 514 matches front surface 512. For example, rear surface 514 may be arranged parallel to one another. For another example, rear surface 514 and front surface 512 may be angled inwardly or outwardly at the same angle.

In one embodiment, rear surface 514 is curved with respect to front surface 512. For example, as illustrated in FIG. 5B, rear surface 514 may be convex such that rear surface 514 protrudes from plug housing 502 in a direction away from front surface 512. For another example, rear surface 514 may be concave such that rear surface 514 is indented inward toward front surface 512. In some embodiments, rear surface 514 is not curved with respect to front surface 512. For example, rear surface 514 may be substantially planar. In other embodiments, rear surface 514 may be both curved and angled.

In some embodiments, rear surface 514 is curved and/or angled to match a contour of an outer surface of an electronic device in which a corresponding receptacle connector is housed so that, when plug housing 502 is fully inserted into and mated with the corresponding receptacle connector, rear surface 514 is flush with the outer surface of the electronic device. For example, rear surface 514 may be curved and/or angled to match a contour of an outer surface of electronic device 100. In some embodiments, the outer surface may be a side surface 106; in other embodiments, the outer surface may be rear surface 104. By way of such an angle and/or curvature of rear surface 514, when plug housing 502 is fully inserted into and mated with a corresponding receptacle connector of electronic device 100, such as receptacle connector 114, rear surface 514 is flush with the outer surface (e.g., side surface 106 and/or rear surface 104) of electronic device 100.

As previously discussed, connector 500 includes one or more pins 506. Each pin 506 includes a connecting portion 522 for mechanically and electrically coupling to a corresponding hole on cable 254. Accordingly, each connecting portion 522 may be shaped for engaging a corresponding hole on cable 254. For example, connecting portion 522 may be in the shape of a cylinder. For another example, connecting portion 522 may have a cross-section in the shape of a circle, oval, square, rectangle, etc.

In one embodiment, when pin 506 is fitted into plug housing 502, connecting portion 522 may protrude or extend from plug housing 502. For example, connecting portion 522 may extend in a direction substantially perpendicular to rear surface 514. In some cases, rear surface 514 may be curved. In such cases, connecting portion may extend in a direction substantially perpendicular to a planar surface that is tangential to curved rear surface 514.

In another embodiment, pairs of pins 506 arranged adjacent to one another have connecting portions 522 that are staggered or vertically offset with respect to one another. For example, a pair of pins 506 may include a first connecting portion 522a associated with a first one of the pair and a second connecting portion 522b associated with a second one of the pair. The first connecting portion 522a may extend from rear surface 514 such that it is located closer to bottom surface 510 than top surface 508, while the second connecting portion 522b may extend from rear surface 514 such that it is located closer to top surface 508 than bottom surface 510. Staggering connecting portions 522 of adjacent pins 506 may advantageously reduce contact interference between adjacent pins 506 when coupled to holes on cable 254.

In yet other embodiments, connecting portions 522 of some or all of pins 506 may be arranged substantially parallel to one another such that they are arranged in substantially the same plane between side surfaces 516.

According to some embodiments, the first portion of pull tab 410 may be bonded to some or all of top surface 508 or to some or all of top plate 507. According to other embodiments, a portion of top surface 508 or a portion of top plate 507 is recessed so as to form a recessed portion 508a. In such embodiments, the first portion of pull tab 410 may be bonded to some or all of recessed portion 508a.

Figure 5C:
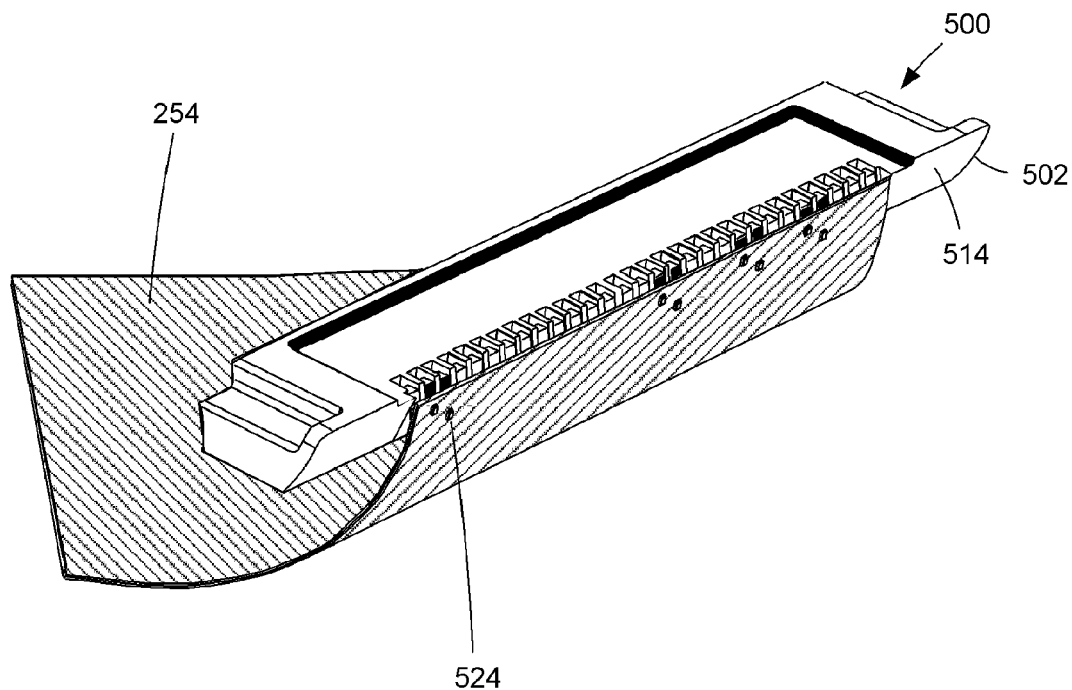
FIG. 5C is a perspective view of an electrical plug connector coupled to a cable according to an embodiment of the present invention.

FIG. 5C is a perspective view of an electrical plug connector 500 coupled to a cable 254 according to an embodiment of the present invention. As previously discussed, cable 254 may include holes for receiving connecting portions 522 of one or more pins 506. For example, cable 254 may include one or more holes 524 spatially arranged to receive connecting portions 522. In some embodiments, pairs of pins 506 arranged adjacent to one another have connecting portions 522 that are staggered or vertically offset with respect to one another. Accordingly, pairs of holes 524 arranged adjacent to one another may be similarly staggered or vertically offset with respect to one another. In other embodiments, some or all of holes 524 may be arranged substantially parallel to one another such that they are arranged in substantially the same plane between side edges of cable 254.

In one embodiment, cable 254 includes a first portion and a second portion. The first portion is mechanically coupled to rear surface 514. As previously mentioned, the first portion may be mechanically coupled by soldering together the connecting portions of pins and holes 524. By way of this coupling to rear surface 514, the first portion may be curved to match a contour of rear surface 514 and, in some embodiments, an outer surface of an electronic device. The second portion extends from the first portion.

By way of its flexibility, the second portion of cable 254 may be arranged in a same plane as the first portion. For example, the second portion may extend from the first portion in a direction substantially parallel with rear surface 514. Further by way of its flexibility, the second portion of cable 254 is operable to curve around bottom surface 510. For example, cable 254 may curve around bottom surface 510 and extend parallel to a direction in which the pins arranged in plug housing 502 extend. In this fashion, cable 254 may be hidden from view when the cable assembly is incorporated into a digital signage system.

Figure 6A:
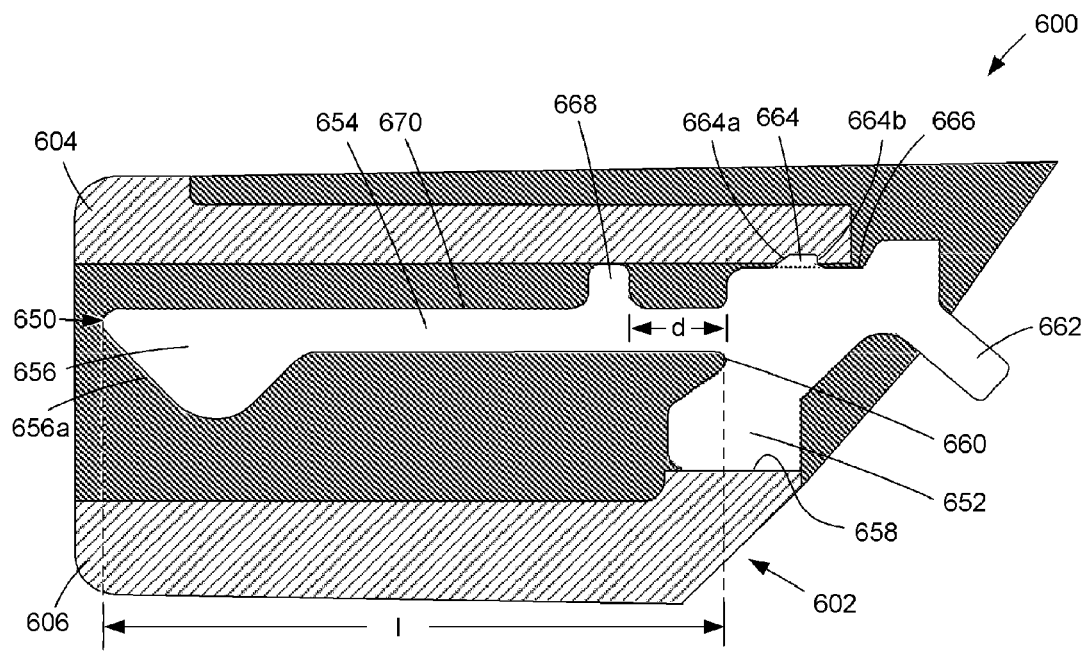
FIG. 6A is a side view of a pin arranged in an electrical plug connector according to an embodiment of the present invention.

FIG. 6A is a side view of a pin arranged in an electrical plug connector 600 according to an embodiment of the present invention. Connector 600 includes a plug housing 602 that may be made of any material for forming a substantially solid non-conductive entity. For example, plug housing 602 may be made from composite materials, semiconductors, plastics, etc.

Plug housing 602 includes a top shelf 604 and a bottom shelf 606. Top shelf 604 and bottom shelf 606 may function together to provide a friction fit or interference fit for a pin 650. That is, upon fitting pin 650 into plug housing 602, a position of pin 650 within plug housing 602 may be substantially maintained by friction forces between pin plug housing 602 and pin 650.

Pin 650 includes various feature that, alone or in combination, enable plug housing 602 and pin 650 to constitute a low profile male connector. In general, pin 650 includes a base 652 for supporting pin 650 within plug housing 602, an elongated shaft 654 extending from base 652, and an engaging portion 656 located on an end of elongated shaft 654 opposite base 652 for engaging a receiving pin of a corresponding receptacle connector.

In one embodiment, base 652 includes a bottom surface 658 for mating with and engaging bottom shelf 606. For example, bottom surface 658 may be substantially planar. Such a mating and engagement may increase a quality of the friction fit between plug housing 602 and pin 650.

In another embodiment, base 652 includes a cutout 660 for extending a length of elongated shaft 654. As illustrated in FIG. 6A, cutout 660 may have a cross section in the shape of triangle. However, cutout 660 may have cross sections in other shapes as well; for example, the shape of a square, rectangle, circle, oval, etc. Extending the length of shaft advantageously reduces the magnitude of rotational forces applied to and stresses within pin 650 when pin 650 is engaged with a receiving pin.

In particular, reducing the size of electrical connectors typically requires the reduction in size of pins housed within the connectors. Upon reducing the size of such pins, the magnitude of rotational forces applied to such pins and the magnitude of stresses within such pins is increased when such pins engage receiving pins. For example, when the length of a pin is decreased, a stiffness of the pin is consequently increased. By increasing the stiffness of the pin, a rotational force applied to the pin from engaging a receiving pin is consequently increased. Such rotational forces may, after only few engagements, disadvantageously cause the pin to permanently rotate out of its original position, thereby reducing the quality of an electrical connection between the pin and the receiving pin. Further, by increasing the stiffness of the pin, stresses within such pins are increased. For example, by increasing the stiffness of the pin, a stress at the junction of a shaft and a base of such a pin is increased when the pin is engaged with a receiving pin. Such increased stress may, after only few engagements, disadvantageously cause the pin to permanently deform or, in some cases, break.

Accordingly, in some embodiments, base 652 includes cutout 660. Cutout 660 may advantageously increase the length of elongated shaft 654 while maintaining a friction fit via bottom surface 658, thereby enabling pin 650 to maintain its position within plug housing 602 while reducing the likelihood of pin rotation, deformation or breakage.

In some embodiments, base 652 may include a connecting portion 662. As previously discussed, connecting portion 662 may protrude from plug housing 602 for establishing a mechanical and electrical connection with a hole 524 of cable 254.

In one embodiment, base 652 includes one or more barbs for engaging a plug housing. For example, base 652 may include a barb 664 for engaging top shelf 604. To enable such an engagement, top shelf 604 may include a slit or cutout in which barb 664 travels when pin 650 is fitted into plug housing 602. Barb 664 may include a leading edge 664a and a stopping edge 664b. Leading edge 664a may be slanted at an angle relative to a top surface 666 of base 652 for enabling pin 650 to be inserted into plug housing 602. Stopping edge 664b may be substantially perpendicular to top surface 666 for resisting removal of pin 650 from plug housing 602. In this fashion, a position of pin 650 within plug housing 602 may advantageously be maintained.

In another embodiment, elongated shaft 654 may include a limit stop 668 protruding from a top surface 670 of elongated shaft 654. Limit stop 668 may have a cross section in any one of a number of shapes. For example, as illustrated in FIG. 6A, limit stop 668 may have a cross section that is substantially rectangular; for other examples, the cross section may be substantially square, circular, oval, etc. Limit stop 668 may be disposed along elongated shaft 654 at a predetermined distance 'd' from base 652. For example, 'd' may equal to approximately ⅕ of the length 'l' of elongated shaft 654. For another example, 'd' may be in a range of approximately ⅒ and ⅖ of length 'l'. For yet another example, 'd' may be equal to less than ⅒ or greater than ⅖ of length 'l'.

By disposing limit stop 668 at a predetermined distance from base 652, limit stop 668 may function to distribute a force applied to elongated shaft 654 upon engagement of engaging portion 656 with a receiving pin. For example, if no limit stop is provided, upon deflection of elongated shaft 654 due to engagement with a receiving pin, significant stress may be placed at the junction of elongated shaft 654 and base 652. However, if a limit stop is provided, upon deflection of elongated shaft 654 due to engagement with a receiving pin, some of the rotational force causing stress at the junction is distributed to top shelf 604 via limit stop 668. By such a distribution, stress at the junction and thus likelihood of pin deformation or breakage is advantageously reduced.

In yet other embodiments, engaging portion 656 includes a leading edge 656a that is slanted at an angle relative to top surface 670 for enabling pin 650 to engage a receiving pin. According to one embodiment, leading edge is provided at an angle of approximately 45 degrees relative to top surface 650. In other embodiments, leading edge is provided at an angle between 40 and 50 degrees. In yet other embodiments, leading edge is provided at an angle less than 40 degrees or greater than 50 degrees.

Figure 6B:
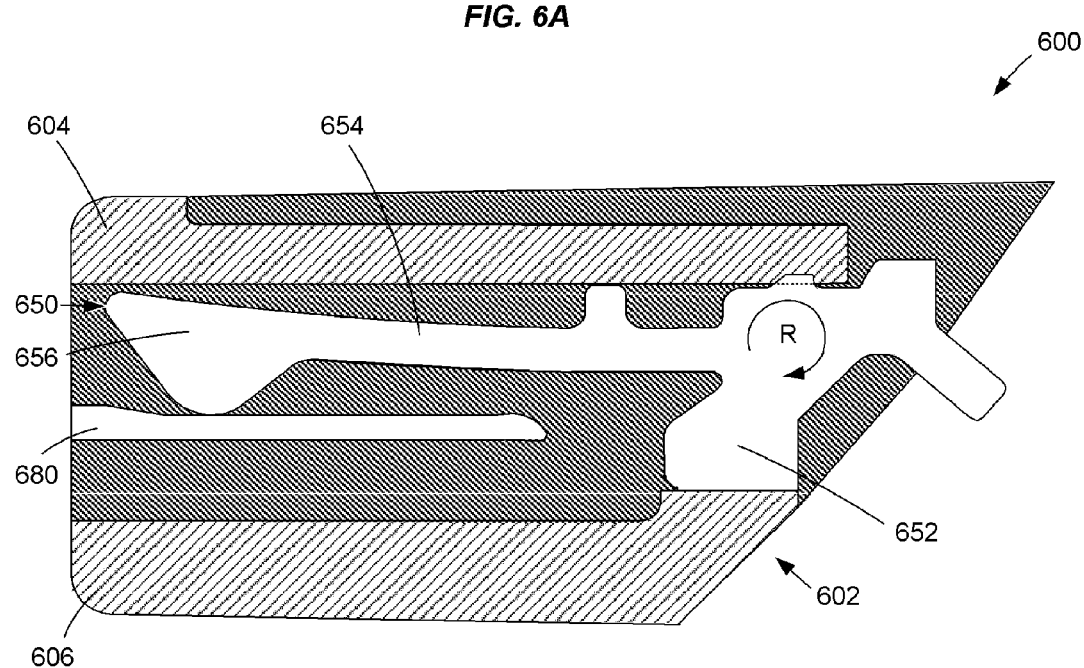
FIG. 6B is a side view of a pin arranged in an electrical plug connector engaged with a receiving pin according to an embodiment of the present invention.

FIG. 6B is a side view of a pin 650 arranged in an electrical plug connector 600 engaged with a receiving pin 680 according to an embodiment of the present invention. As previously discussed, pin 650 may engage with a receiving pin 680. Receiving pin 680 may be arranged, for example, within receptacle connector 114 of electronic device 100. Upon engagement of pin 650 with receiving pin 680, pin 650 may be caused to deflect. For example, pin 650 may be caused to deflect vertically toward top shelf 604. As previously discussed, such a deflection may cause stresses at the junction of elongated shaft 654 and base 652 which may, in some embodiments, be reduced by a cutout 660 in base 652 for extending the length of elongated shaft 654. Further, as previously discussed, the deflection forces may tend to cause pin 650 to rotate; for example, they may tend to cause pin 650 to rotate in direction R. In some embodiments, however, such rotational forces may be reduced by incorporation of a limit stop 668.

Figure 7A:
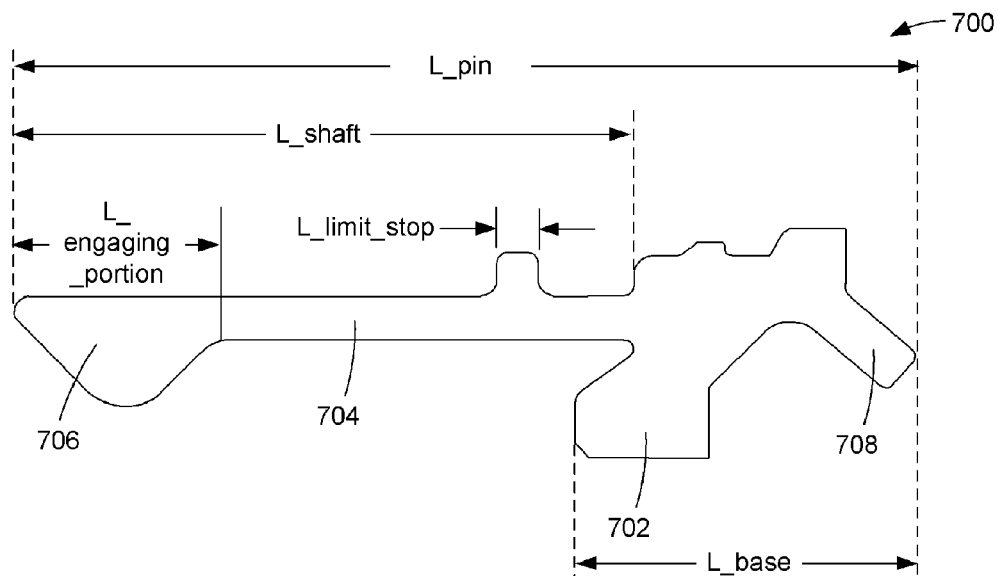
FIG. 7A is a side view of a pin according to a first embodiment of the present invention.

FIG. 7A is a side view of a pin 700 according to a first embodiment of the present invention. Pin 700 may be made using any type of rigid conductive material. For example, pin 700 may be made using one or more metals such as copper, nickel, tin or magnesium. Pin 700 includes a base 702 for supporting pin 700 within a plug housing, an elongated shaft 704 extending from base 702, and an engaging portion 706 located on an end of elongated shaft 704 opposite base 702 for engaging a receiving pin of a corresponding receptacle connector. Base 702 includes a connecting portion 708.

According to one embodiment, as illustrated in FIG. 7A, connecting portion 708 extends from an upper edge of pin 700. Connecting portion 708 may extend from the upper edge at any one of a variety of angles. For example, connecting portion 708 may extend at an angle of approximately 45 degrees from a direction in which elongated shaft 704 extends from base 702. For another example, connecting portion 708 may extend at an angle in a range of approximately 30 to 60 degrees from a direction in which elongated shaft 704 extends from base 702. For yet another example, connecting portion 708 may extend at an angle of less than 30 degrees or greater than 60 degrees from a direction in which elongated shaft 704 extends from base 702. In one embodiment, as illustrated in FIG. 7A, connecting portion 708 extends in a direction toward a bottom surface of base 702. In another embodiment, connecting portion 708 extends in a direction toward a top surface of base 702.

Figure 7B:
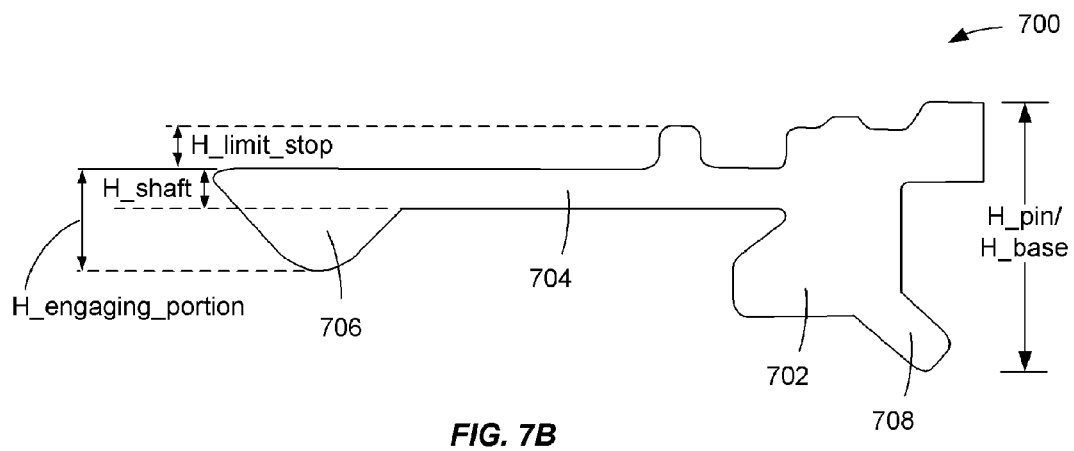
FIG. 7B is a side view of a pin according to a second embodiment of the present invention.

FIG. 7B is a side view of a pin 700 according to a second embodiment of the present invention. According to one embodiment, as illustrated in FIG. 7B, connecting portion 708 extends from a lower edge of pin 700. Connecting portion 708 may extend from the lower edge at any one of a variety of angles. For example, connecting portion 708 may extend at an angle of approximately 45 degrees from a direction in which elongated shaft 704 extends from base 702. For another example, connecting portion 708 may extend at an angle in a range of approximately 30 to 60 degrees from a direction in which elongated shaft 704 extends from base 702. For yet another example, connecting portion 708 may extend at an angle of less than 30 degrees or greater than 60 degrees from a direction in which elongated shaft 704 extends from base 702. In one embodiment, as illustrated in FIG. 7B, connecting portion 708 extends in a direction away from a top surface of base 702. In another embodiment, connecting portion 708 extends in a direction toward the top surface of base 702.

With reference to both FIGS. 7A and 7B, pin 700 may have any one or a number of predetermined dimensions. For example, pin 700 may have an overall length L_pin of approximately 4.7 mm, or an overall length of approximately 4.3 mm. Alternatively, L_pin may be in a range of approximately 4 mm to 5 mm, or less than 4 mm or greater than 5 mm. For another example, pin 700 may have an overall height H_pin of approximately 1.5 mm or 1.4 mm. Alternatively, H_pin may be in a range of approximately 1.2 mm to 1.8 mm, or less than 1.2 mm or greater than 1.8 mm. For a further example, pin may have a depth or thickness (not illustrated) of approximately 0.2 mm, or in a range of approximately 0.15 mm to 0.25 mm, or less than 0.15 mm or greater than 0.25 mm.

Various elements of pin 700 may have any one or a number of predetermined dimensions. For example, base 702 may have a length L_base of approximately 1.3 mm or 1.4 mm. Alternatively, L_base may be in a range of approximately 1 mm to 1.7 mm, or less than 1 mm or greater than 1.7 mm. Base 702 may have a height H_base approximately equal to H_pin. For another example, elongated shaft 704 may have a length L_shaft of approximately 2.7 mm or 2.8 mm. Alternatively, L_shaft may be in a range of approximately 2.2 mm to 3.2 mm, or less than 2.2 mm or greater than 3.2 mm. Elongated shaft 704 may have a height H_shaft approximately equal to 0.2 mm or 0.25 mm. Alternatively, H_shaft may be in the range 0.15 mm to 0.3 mm, or less than 0.15 mm or greater than 0.3 mm. For a further example, a limit stop of elongated shaft 704 may have a length L limit stop approximately equal to H_shaft. The limit stop may have a height H_limit_stop also approximately equal to H_shaft. For another example, engaging portion 706 may have a length L_engaging_portion approximately equal to 0.7 mm or 0.8 mm. Alternatively, L_engaging_portion may be in the range 0.5 mm to 1 mm, or less than 0.5 mm or greater than 1 mm. Engaging portion 706 may have a height H_engaging_portion approximately equal to 0.6 mm or 0.7 mm. Alternatively, H_engaging_portion may be in the range of approximately 0.3 mm to 1 mm, or less than 0.3 mm or greater than 1 mm.

Various embodiments for improved connectors, cable assemblies, and connector pins according to the present invention have been described. While these inventions have been described in the context of the above specific embodiments, many modifications and variations are possible. The above description is therefore for illustrative purposes and is not intended to be limiting. Also, references to top or bottom, or front and back of the various structures described above are relative and are used interchangeably depending on the point of reference. Similarly, dimensions and sizes provided throughout the above description are for illustrative purposes only and the inventive concepts described herein can be applied to structures with different dimensions. Accordingly, the scope and breadth of the present invention should not be limited by the specific embodiments described above and should instead be determined by the following claims and their full extend of equivalents.

What is claimed is:
1. A cable assembly comprising:
a connector plug having a housing arranged to fit entirely in a connector receptacle in an electronic device, the connector plug having a rear surface contoured to be flush with a surface of the electronic device;
a plurality of contacts located in the connector plug housing, each contact having an engaging portion to contact a corresponding contact in the connector receptacle and a connecting portion extending to the rear surface; and a cable attached to the plurality of contacts located in the connector plug.

2. The cable assembly of claim 1 wherein the cable is substantially flat.

3. The cable assembly of claim 2 wherein the cable is a flex cable.

4. The cable assembly of claim 1 further comprising a pull tab attached to the connector plug.

5. The cable assembly of claim 4 further wherein the pull tab is a ribbon.

6. The cable assembly of claim 1 wherein the cable is attached to the connecting portions of the contacts.

7. The cable assembly of claim 6 wherein the cable may be routed along an underside of the electronic device.

8. The cable assembly of claim 1 wherein the cable comprises a plurality of conductors, each conductor is attached to a connecting portion of a contacts at a rear surface of the connector plug.

9. The cable assembly of claim 8 wherein the plurality of conductors are arranged in parallel.

10. A cable assembly comprising:
a connector plug having a front surface, top surface, bottom surface, and side surfaces to fit in a connector receptacle of an electronic device, the connector plug having a rear surface contoured such that it is substantially flush with an outside surface of the electronic device adjacent to the connector receptacle;
a plurality of contacts located in the connector plug housing, each contact having an engaging portion to contact a corresponding contact in the connector receptacle and a connecting portion extending to the rear surface; and
a cable attached to the connecting portions of the plurality of contacts located in the connector plug.

11. The cable assembly of claim 10 wherein the cable comprises a plurality of conductors, each conductor is attached to a connecting portion of a contacts at a rear surface of the connector plug.

12. The cable assembly of claim 11 wherein the plurality of conductors are arranged in parallel.

13. The cable assembly of claim 12 wherein the cable is substantially flat.

14. The cable assembly of claim 13 wherein the cable is a flex cable.

15. The cable assembly of claim 14 wherein the cable may be routed along an underside of the electronic device.

16. The cable assembly of claim 10 further comprising a pull tab attached to the connector plug.

17. The cable assembly of claim 16 further wherein the pull tab is a ribbon.

18. A cable assembly comprising:
a connector plug having a housing arranged to fit in a connector receptacle in an electronic device, the connector plug having a rear surface contoured to be substantially flush with an outside surface of the electronic device adjacent to the connector receptacle;
a plurality of contacts located in the connector plug housing, each contact having an engaging portion to contact a corresponding contact in the connector receptacle and a connecting portion; and
a cable having a plurality of conductors arranged in parallel, each conductor attached to a connecting portion of a contact in the plurality of contacts located in the connector plug.

19. The cable assembly of claim 18 wherein the cable may be routed along an underside of the electronic device.

20. The cable assembly of claim 18 wherein the connecting portions of the plurality of contacts extend to the rear surface of the plug housing.

* * * * *